No. 694,925. Patented Mar. 4, 1902.
D. H. HOUSTON.
FOLDING ROLL HOLDING CAMERA.
(Application filed Mar. 5, 1901. Renewed Feb. 3, 1902.)
(No Model.)
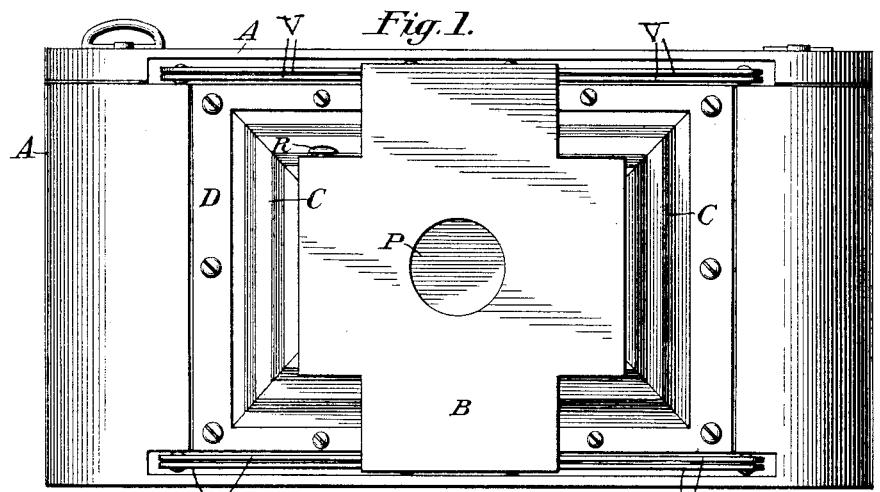
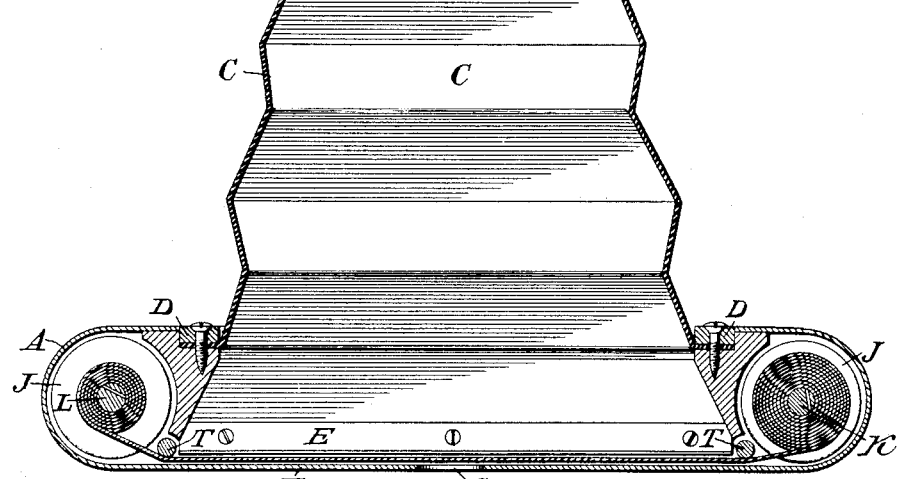
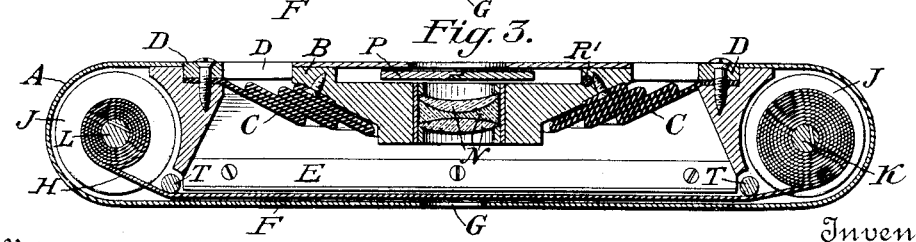
Witnesses
R. A. Balderson
Geo. E. Garrett
Inventor
David Henderson Houston

UNITED STATES PATENT OFFICE.

DAVID HENDERSON HOUSTON, OF HUNTER, NORTH DAKOTA.

FOLDING ROLL-HOLDING CAMERA.

SPECIFICATION forming part of Letters Patent No. 694,925, dated March 4, 1902.

Application filed March 5, 1901. Renewed February 3, 1902. Serial No. 92,321. (No model.)

*To all whom it may concern:*

Be it known that I, DAVID HENDERSON HOUSTON, a citizen of the United States, residing at Hunter, in the county of Cass and State of North Dakota, have invented certain new and useful Improvements in Folding Roll-Holding Cameras; and I do hereby declare the following to be a full, clear, and exact description of the invention, such as will enable others skilled in the art to which it appertains to make and use the same.

My invention relates to folding photographic cameras.

The object of my invention is to economize space in the construction of cameras, and thereby construct cameras having larger space for the production of pictures in proportion to the size of the casing of the camera than has heretofore been possible under the old method of construction.

By my invention the space formerly occupied by the rear frame of the bellows of the camera is by me utilized as space for presenting the sensitized surface of plates or films to the actinic action of light passed through a lens.

Cameras heretofore have had the rear frame of the bellows connected at the rear interior part of the compartment for holding the bellows, and thus occupying space that can be more advantageously employed for impressing a sensitized surface, whereas by my invention space is economized by my novel method of connecting the rear frame of the camera-bellows at or near to the front side of the camera-casing and folding the bellows into the bellows-compartment beyond the position of the frame on the rear end of the bellows and in a novel manner.

My invention consists in novel features of construction and combination of parts pointed out in the claims of this specification.

Figure 1 represents a front view of a camera closed and showing how the rear frame of the camera-bellows may be fastened to the front part of the camera-casing. Fig. 2 represents a sectional plan view of a camera and showing my method of fastening the rear frame of the camera-bellows into the front part of the camera-casing and of my novel front of the camera having the rear corners of the camera-front mitered or rounded to allow the bellows of the camera to have room to fold into the camera-casing; but said mitering or rounding would not be necessary in a camera-front made of metal. Fig. 3 represents a sectional plan view of a camera closed and showing my method of fastening the rear frame of the camera-bellows to the front part of the camera-casing and also showing a novel construction of the camera-front and showing how the bellows of the camera folds into the camera.

Similar letters of reference denote similar parts in all of the drawings.

A indicates the camera-casing; B, the camera-front; C, the camera-bellows; D, the rear frame of the bellows; E, the film-edge holder; F, the back of the camera; G, the sight-aperture in the back of the camera; H, the sensitized film; J, the spool-flanges; K, the supply-spool; L, the reel-spool; N, the lens; P, the shutter; R, the touch-button; R', the touch-button rod; T, the guide-rollers; V, the folding supports for extending and supporting the bellows.

Having fully described my invention, I claim—

1. In a photographic camera, the combination with a suitable casing, of two side compartments for holding rolls of sensitized film, a reel-winding device passing from the outside of the camera-casing to the interior thereof, said reel-winding device adapted to connect with and wind a reel-spool positioned in one of the outer compartments, a central compartment for exposing the sensitized film situated between the two side compartments, a bellows connected at its rear end at the front side of the central compartment, a front and lens and shutter closing the front end of said bellows, said front of the bellows and the parts carried thereby and the bellows all adapted to fold into the said central compartment of the camera, and means for extending the bellows and supporting the front of said bellows in a position where the lens carried in said front will be focused upon the sensitized film when the said film is extended across the rear interior part of the said central compartment of the camera.

2. In a photographic camera, the combination with a suitable casing, of two side compartments for holding rolls of sensitized film, a reel-winding device passing from the outside of the camera-casing to the interior thereof, said reel-winding device adapted to connect with and wind a reel-spool positioned in one of the outer compartments, a central compartment for exposing the sensitized film situated between the two side compartments, a bellows having its rear frame connected to the front side of the camera-casing, said frame surrounding the front side of the central compartment, a front and lens and shutter closing the front end of said bellows, said front of the bellows and the parts carried thereby and the bellows all adapted to be carried in said central compartment, and means for extending the bellows and supporting the front of said bellows in a position where the lens carried in said front will be focused upon the sensitized film when the said film is extended across the rear interior part of the said central compartment of the camera.

3. In a photographic camera, the combination with a suitable casing, of two side compartments for holding rolls of sensitized film, a reel-winding device passing from the outside of the camera-casing to the interior thereof, said reel-winding device adapted to combine with and wind a reel-spool positioned in one of the side compartments, a central compartment for exposing the sensitized film, said central compartment situated between the two side compartments, a camera-front having its rear corners cut away, a bellows connected at its front end to the said front, said bellows connected at its rear end to the front side of the camera-casing, said camera-front and the parts carried thereby and the bellows all adapted to be carried in the said central compartment of the camera, and means for extending the bellows and supporting the front of said bellows in a position where the lens carried in said front will be focused upon the sensitized film when the said film is extended across the rear interior part of the said central compartment of the camera.

In testimony whereof I affix my signature in presence of two witnesses.

DAVID HENDERSON HOUSTON.

Witnesses:
WM. H. DE LACY,
R. A. BALDERSON.